United States Patent [19]

Luzzi, Jr.

[11] 4,343,760
[45] Aug. 10, 1982

[54] DIVERTOR TARGET FOR MAGNETIC CONTAINMENT DEVICE

[75] Inventor: Theodore E. Luzzi, Jr., Garden City, N.Y.

[73] Assignee: The United States of America as represented by the United States Department of Energy, Washington, D.C.

[21] Appl. No.: 93,952

[22] Filed: Nov. 14, 1979

[51] Int. Cl.³ ............................................. G21B 1/00
[52] U.S. Cl. .................................................. 376/134
[58] Field of Search ......................... 176/3, 9, 6, 8, 61; 376/134

[56] References Cited

U.S. PATENT DOCUMENTS

| | | | |
|---|---|---|---|
| 3,016,341 | 1/1962 | Spitzer, Jr. | 176/9 |
| 3,467,885 | 9/1969 | Cann | 176/6 |
| 4,065,351 | 12/1977 | Jassby et al. | 176/3 |
| 4,149,931 | 4/1979 | Christensen | 176/9 |

FOREIGN PATENT DOCUMENTS

| | | | |
|---|---|---|---|
| 851148 | 10/1960 | United Kingdom | 176/3 |
| 960678 | 6/1964 | United Kingdom | 176/61 |

OTHER PUBLICATIONS

Sixth Symp. on Eng. Problems of Fusion Research, San Diego, Calif., Nov. 18-21, 1975, pp. 194-197.
Chem. Eng.-Progress Sym. Series, #32, 1961, vol. 57, Gambill et al., pp. 127-137.
ANS Trans., vol. 27, 11/27-12/2/77, Twining, pp. 1007-1014.
ANS Trans., 6/13-18/76, p. 39, Moir et al.
UCID-16229, 3/73, Wood et al., pp. 1-10, FIG. 1-5.
Proc. 7th Sym. on Eng. Problems of Fusion Research vol. II, 10/77, Kim et al., pp. 1593-1594.
Trans-ASME J. Heat Transfer, vol. 91, 8/69, Lopina et al., pp. 434-442.

Primary Examiner—Harvey E. Behrend
Attorney, Agent, or Firm—Cornell D. Cornish; Leonard Belkin; James E. Denny

[57] ABSTRACT

In a plasma containment device of a type having superconducting field coils for magnetically shaping the plasma into approximately the form of a torus, an improved divertor target for removing impurities from a "scrape off" region of the plasma comprises an array of water cooled swirl tubes onto which the scrape off flux is impinged. Impurities reflected from the divertor target are removed from the target region by a conventional vacuum getter system. The swirl tubes are oriented and spaced apart within the divertor region relative to the incident angle of the scrape off flux to cause only one side of each tube to be exposed to the flux to increase the burnout rating of the target. The divertor target plane is oriented relative to the plane of the path of the scrape off flux such that the maximum heat flux onto a swirl tube is less than the tube design flux. The containment device is used to contain the plasma of a tokamak fusion reactor and is applicable to other long pulse plasma containment systems.

6 Claims, 12 Drawing Figures

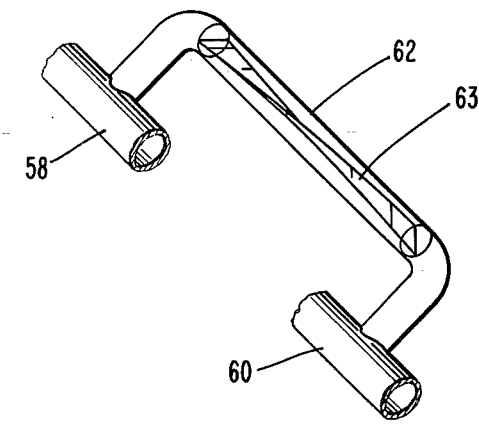
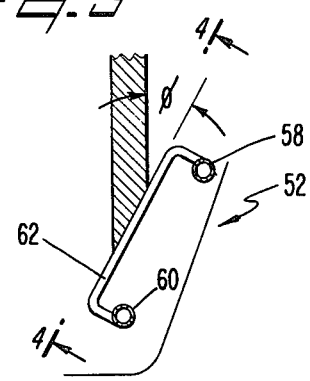
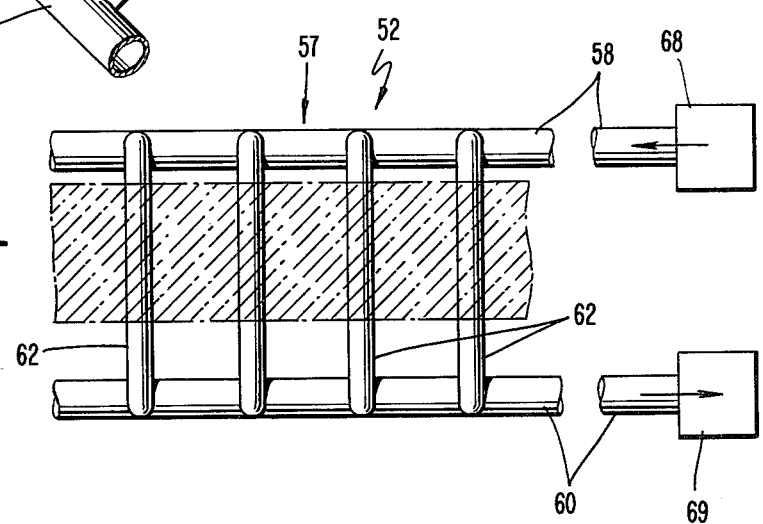
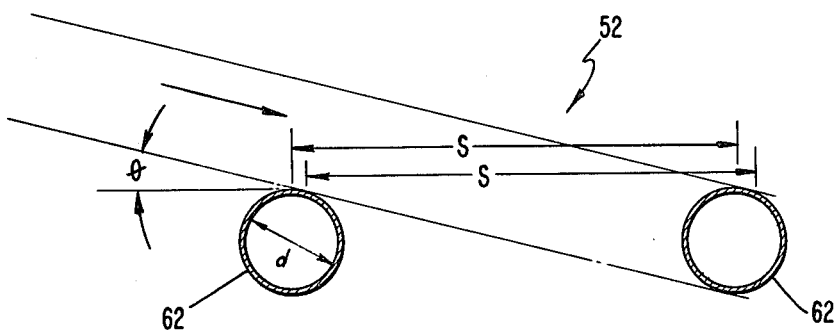

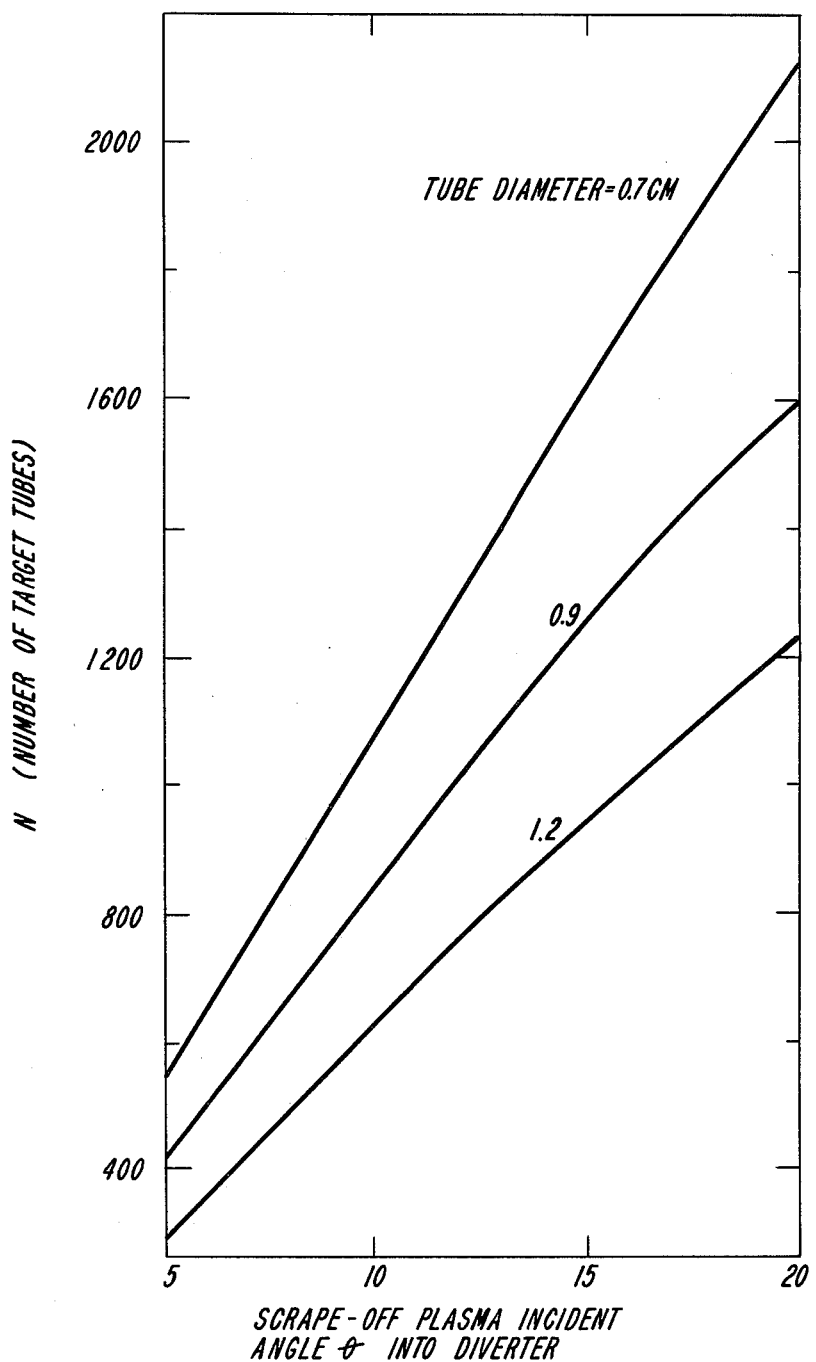

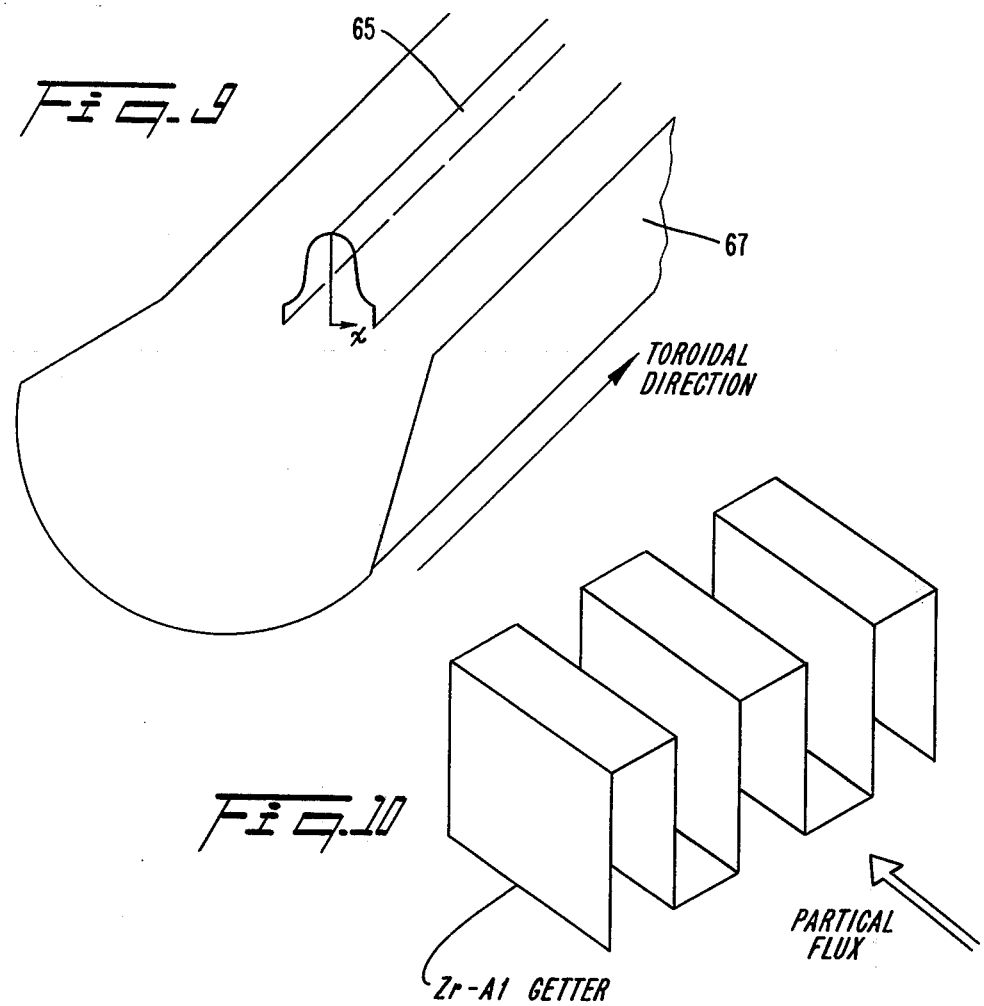
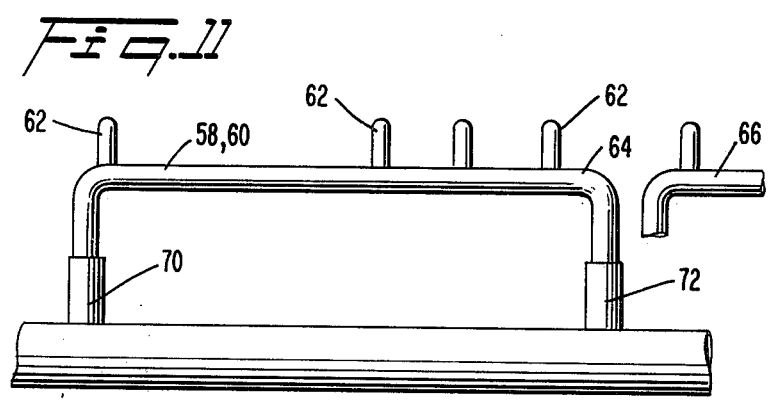

DIVERTOR TARGET FOR MAGNETIC CONTAINMENT DEVICE

ORIGIN OF THE INVENTION

The invention described herein is made in the course of, or under contract with, the United States Department of Energy.

TECHNICAL FIELD

The present invention is directed generally toward divertor targets for high energy plasma containment devices, and more particularly, toward an actively cooled divertor target for particle collection in the scrape off region of a plasma containment device adapted for application in a tokamak fusion reactor.

BACKGROUND ART

Nuclear fusion takes place when nuclei of atoms collide at high energies to form a nucleus which is more complex but whose rest mass is less than the sum of the rest masses of the original nuclei. To achieve the energies necessary to enable fusion processes to take place, the gas serving as fuel must be heated to extremely high temperatures (millions of degrees Farenheit) whereby the gas becomes completely ionized as a plasma, i.e., all the atoms split up into freely moving electrons and ions. The plasma which is maintained within a vacuum chamber is compressed into a relatively small space by the action of a sufficiently strong magnetic field while being maintained out of contact with the inner wall of the chamber. Because charged particles tend to gyrate along magnetic field lines, the resulting plasma can be confined in a suitably shaped magnetic containment structure, such as a toroid. If a plasma is to be confined in the shape of a torus, however, the magnetic bottle confining it cannot consist only of a toroidal magnetic field. The particles themselves would set up an electric field normal to the magnetic field and under the action of this field and the existing toroidal magnetic field would drift out of the plasma.

As a solution, in the tokamak approach, an electric current is induced along the plasma column flowing the long way around the torus. The associated poloidal magnetic field gives rise to helical field lines which form a set of nested magnetic surfaces. Under these conditions the particles moving along the helical field lines will drift an equal distance away from and towards the center of the plasma during each pass around the torus thus maintaining, on the average, a constant radial position. In practice, the duration of sustainment of the plasma is very short, that is, much less than one second. The hot ions near the center of the plasma, under the influence of collisions, tend to flow out of the plasma. Energy flows out of the plasma by heat conduction. Impurities, which exist in the plasma from, among other sources, the surface of the inner wall of the containing device structure, tend to radiate away (quench) energy and thereby reduce the plasma temperature.

In order to provide a long pulse sustainment capability, e.g., a pulse length of at least 30 seconds with plasma currents in the order of megamperes, it is necessary to provide impurity control. The cross section of the plasma is shaped by sets of poloidal coils to maintain a closed form. Impurities within the plasma tend to flow outwardly toward the surface of the heat shield and enter a "scrape off" region wherein the outer surface of the plasma and impurities are diverted to a lower collector region for impingement on a target. Energy is removed from the scrape-off plasma and its entrained impurities by cooling on the surface of the target. The plasma particles and impurities are then removed by conventional vacuum gettering.

Because the thermal power of the scrape off plasma entering the scrape off region is extremely high, a heat transfer device capable of withstanding the large power flux of the scrape off plasma is required for the divertor target. The target must have a very high burnout heat flux characteristic and must also be actively cooled to remove sufficient energy from the scrape off plasma and impurities to enable removal by conventional gettering techniques.

A general object of the present invention, therefore, is to provide a new and improved divertor target for a plasma magnetic containment device.

A more particular object of the invention is to provide an actively cooled divertor target having a very high burnout characteristic to enable cooling of the scrape off flux and its entrained impurities in a manner whereby none of the scrape off flux impinges directly on other parts of the lower collector region.

Another object is to provide an actively cooled divertor target that is geometrically arranged such that impinging heating flux is maintained at a minimum.

Still another object is to provide an actively cooled divertor target having a minimum number of tubes in order to reduce maintenance problems.

SUMMARY OF THE INVENTION

An actively cooled target positioned in the divertor region of a tokamak or other plasma containment device comprises an array of swirl tubes arranged in a ladder configuration between input and output parallel headers. Water or other liquid coolant is caused to flow through the swirl tubes between the headers as the scrape off plasma flux is cooled by direct impingement thereof onto the outer surfaces of the swirl tubes.

The scrape off flux impinges on the swirl tubes at an acute angle of incidence, $\theta$, such that only one side of each swirl tube is exposed to the plasma flux and there is no pass through of flux to the region behind the swirl tubes. The plane of the swirl tubes is oriented at an acute angle $\phi$ with respect to the plane of the flux path. The angle $\phi$ is made small enough such that the heat input to the swirl tubes is less than a maximum rated input and large enough such that the length of the swirl tubes to intercept the full width of the scrape off plasma flux is no larger than a predetermined length corresponding to the divertor region.

The ladder array of swirl tubes is arranged in the form of modules containing several tubes each connected to the input and output headers by quick release couplings to enable convenient removal for servicing.

BRIEF DESCRIPTION OF THE DRAWINGS

FIG. 3 is a cross sectional view of the divertor target shown in a portion of FIG. 2 illustrating oblique impingement of scrape off plasma flux on the target in accordance with one aspect of the invention.

FIG. 4 is a detailed view of a portion of the divertor target taken along the line 4—4 in FIG. 3.

FIG. 5 is a perspective view of a cylindrical swirl tube used within the divertor target of the invention, with the outer metal cylindrical surface of the tube being transparent for illustration to expose the internal twisted tape.

FIG. 6 is an end view of a pair of the swirl tubes for explaining the tube size and intertube spacing as a function of angle of incidence of the scrape off flux.

FIG. 7 is a graph showing the preferred numbers of target tubes constituting the divertor target as a function of the incident angle of the scrape off plasma and tube diameter.

FIG. 9 shows a Gaussian distribution of scrape off flux incident upon the divertor target.

FIG. 10 is a perspective view of a typical getter used in the present invention.

FIG 11 is a detail of the divertor target, in accordance with the invention, showing the modular construction thereof.

DETAILED DESCRIPTION OF THE INVENTION

Figure 1:
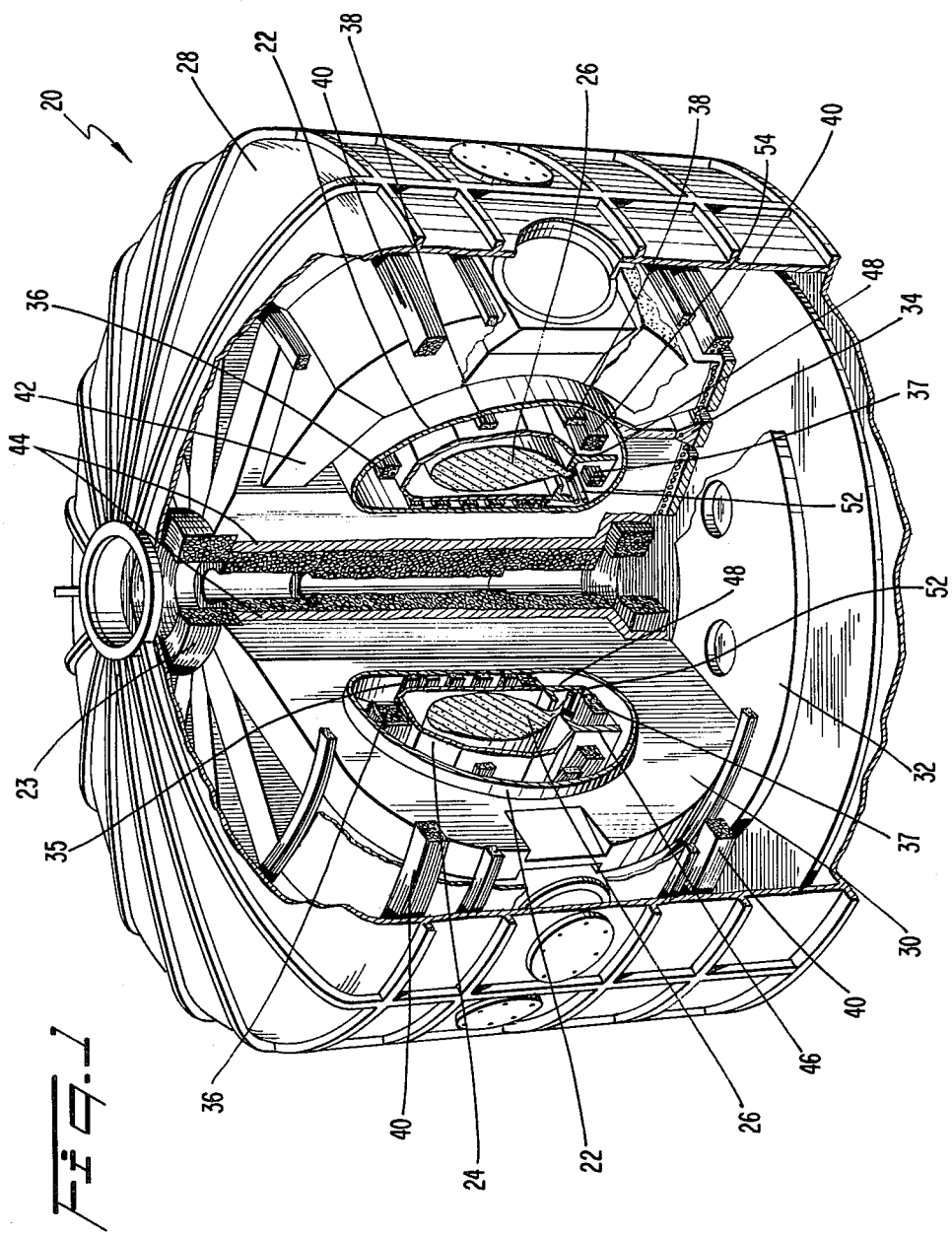
FIG. 1 is a perspective view of a tokamak type plasma containment device having a portion broken away to expose internal details.

Referring to FIG. 1, a plasma containment device 20 adapted to contain the plasma of a tokamak fusion reactor comprises a vacuum vessel 22 supporting an internal heat shield 24 within which is magnetically confined a plasma 26 created by energy generated by ohmic heating coil 23. The plasma 26 is contained within shield 24 by a strong magnetic field generated by toroidal field coils 30 and shaped by a series of poloidal coils 35, 36, 37 and 38. The vacuum vessel 22, which is approximately in the form of a torus, is supported within the outer wall 28 of the containment device 20 by a vessel support link 34. The vessel 22 is supported above a base plate 32 by the vessel support link 34 independent of toroidal field coils 30 and of radially extended torque structure 42 which maintains the field coils rigid during loading of the coil structure by the magnetic field. The independent support of vessel 22 is necessary since the toroidal field coils 30 and the vessel are at different temperatures during operation and must have the ability to differentially expand.

Within the vessel 22 outside heat shield 24, there is provided the series of electromagnetic coils 35, 36, 37 and 38 for shaping the plasma into the approximately elliptical configuration shown in FIG. 1. These coils comprise hexapole coils 35, upper and lower quadrapole coils 36 and 37 as well as nulling coils 38, all of which are poloidal coils designed to impart a predetermined cross sectional configuration to the plasma. Wrapped around the vacuum vessel 22 is also a series of dipole coils 40 which also shapes the plasma into the desired configuration. A bucking cylinder 44 extending downwardly from ohmic heating coil 23 prevents inward movement of the toroidal field coils 30 during generation of the strong magnetic field for containing the plasma within shield 24.

Beneath the vacuum vessel 22, a pair of vacuum getter assemblies 46 and 48 define a lower collector region 50 into which plasma flux is diverted to be collected on divertor targets 52. The basic structure and operation of the plasma containment device 20, being known in the prior art, is not described herein in detail. Reference can be made, however, to Department of Energy Report PPPL-1500, November, 1978, "Superconducting Long-Pulse Experiment (SLPX)", Volumes I and II, for details of the basic containment device structure and operation of the poloidal coils to provide the approximately elliptical cross section configuration of the plasma.

The divertor targets of prior art plasma containment devices have been passive or low heat flux actively cooled (see, e.g., U.S. Pat. No. 4,149,931) and therefore have not been capable of dissipating the substantial quantity of heat created by the scrape off flux. A unique, actively cooled divertor target is provided in accordance with the invention which is capable of operating in the plasma containment or fusion reactor environment. Details of the actively cooled divertor targets 52, in accordance with the invention, are described below following a description of additional structure constituting the SLPX system to which the present invention may be applied.

Figure 2:
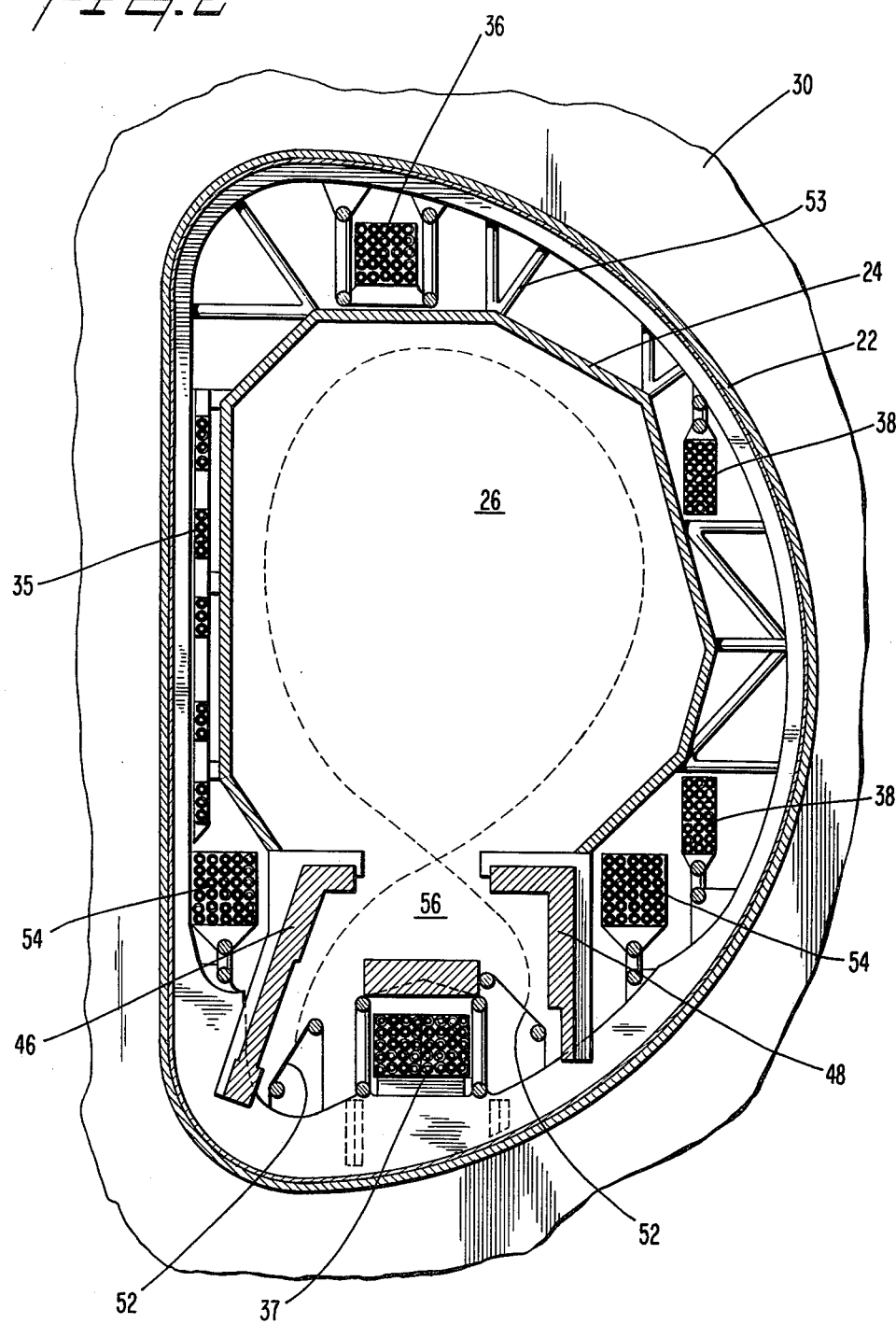
FIG. 2 is a cross sectional view of the vacuum chamber of the containment device showing a cross section of the plasma including scrape off flux entering the lower region to be impinged on a divertor target of the present invention for collection.

Referring to FIG. 2, which shows in more detail the vacuum vessel 22 located within toroidal field coils 30, heat shield 24 is supported away from the wall of vacuum vessel 22 by struts 53. The heat shield 24 extends around the plasma 26 which is contained within the heat shield by the magnetic field generated and shaped by the magnetic coils 35 to 38. As is known, impurities in plasma 26 within a tokamak system tend to flow outwardly to the surface of the plasma torus shown in dotted lines to be diverted downwardly by a pair of divertor coils 54 onto divertor targets 52 at the lower portion or scrape off region 56 of the vacuum vessel 22 beneath getter assemblies 46 and 48. The high energy of particulate impurities within the scrape off flux diverted downwardly into the scrape off region beneath the upper ends of getters 46 and 48 is dissipated within the diverter targets 52 by heat exchange with a coolant, as discussed below in detail, and then absorbed by the getters 46 and 48.

The getters 46 and 48, which are formed of a zirconium-aluminum alloy, are shown in detail in FIG. 10. The getters may be formed, for example, of a zirconium-16% aluminum alloy powder mechanically welded under high pressure to a sheet metal substrate which is formed into strips. The strips are then formed into square wave pattern modules as shown in FIG. 10. The square wave pattern of the preferred divertors provide a very high ratio of surface area to occupied volume.

An important consideration in the design of getters 46, 48 is the particle energy striking the getters as this determines replacement and cooling requirements. The energy of particles striking the getters 46, 48 is determined indirectly by determining the amount of power reflected from the surface of targets 52 as a function of incident energy.

Figure 8:
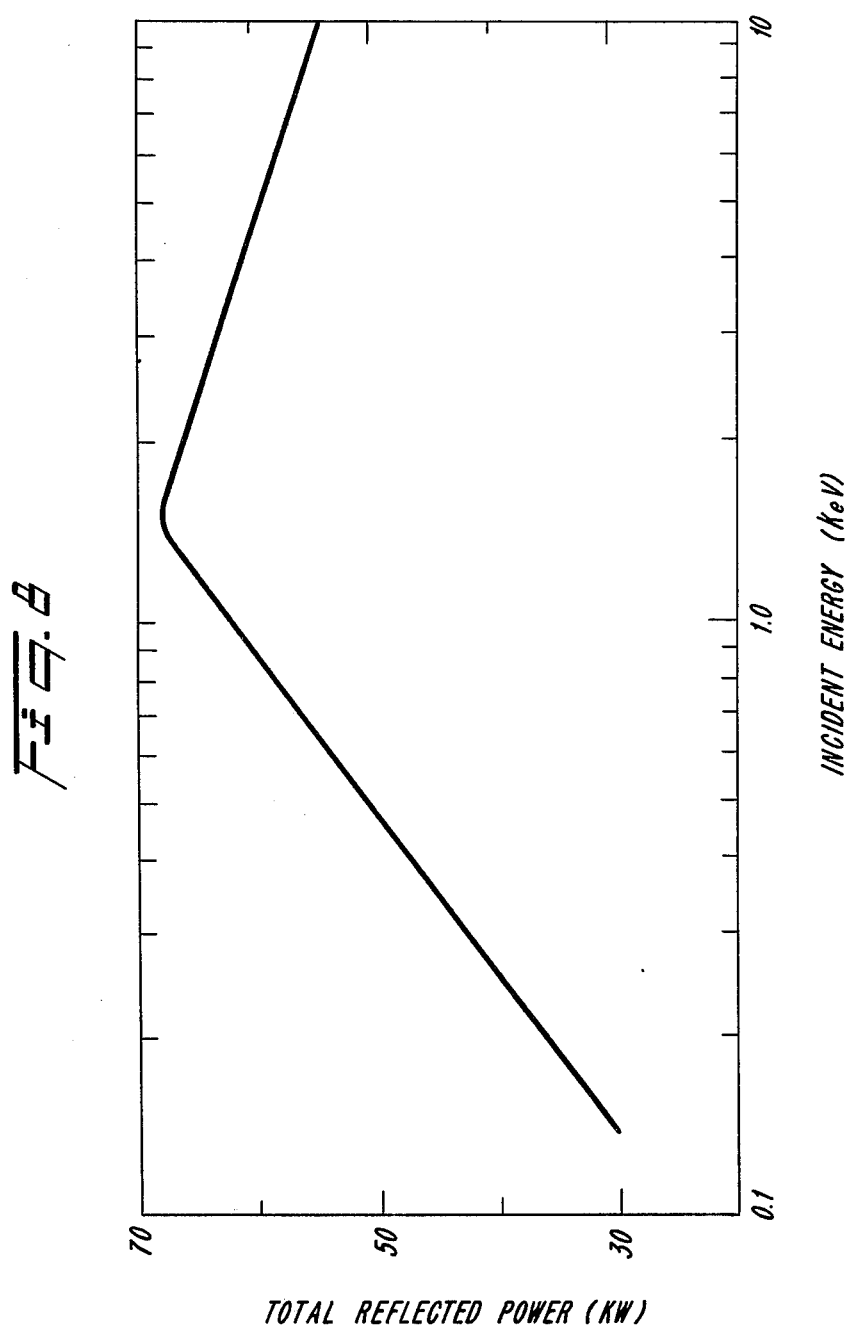
FIG. 8 is a graph showing the total target tube reflected power as a function of incident energy on the divertor target for indicating the amount of scrape off power to which the getter system is exposed.

The particle and energy reflection coefficient for high energy hydrogen atoms leaving a reflecting surface has been reported in the technical paper, Behrisch, R. "Plasma Wall Interactions in Tokamak Reactors for Breakeven, A Critical Study of the Near Term Fusion Reactor Program", Erice Sept. 21–Oct. 11, 1976. The number and energy of the high energy fraction can be determined from this paper. As regards the low energy particles, it is known that at about 10 KeV incident energy, about 80% of the low energy particles leave the target as hydrogen atoms at a reflected energy of between 5 and 25 eV. The other 20% leave as hydrogen molecules at a reflected energy equal to the target tube surface energy. Assuming that the proportion of the low energy atoms and molecules leaving the target remain the same as at 10 KeV, the power leaving the target has been calculated as a function of the incident energy. The results are shown in FIG. 8 which is a plot of reflected power from the targets 52 as a function of incident energy for a tokamak system having divertor targets 52 of the type constituting the invention and described below.

Based upon the above data and heat dissipation characteristics and masses of the getters 46, 48, I have determined that the temperature rise of the getters during a 30 second pulse will be on the order of 1.5° C., and that no external cooling of the getters is therefore needed. In practice, however, cooling panels or shields (not shown) are located behind the getters since the operating and regeneration temperatures of the getters are high (on the order of 400° C.–700° C.) established by electric heaters (also not shown).

With reference to FIG. 9, there is shown a perspective view of the distribution of scrape off flux 65 entering the divertor chamber schematically represented as 67. It is clear that the flux is not distributed uniformly across the section of the flux entering the scrape off region 56. The scrape off flux usually has a maximum at its center of distribution and decreases monotonically and symmetrically on both sides to some minimum value at its edges. It is known that the Gaussian distribution is a good approximation to the true distribution. Therefore, I have used a Gaussian distribution in my analysis and design of the actively cooled target tubes of my invention. Specifically, I have determined that the monotonically decreasing distribution of scrape off flux on the target surfaces is important in determining the maximum power handling capability of the targets; the monotonically decreasing, rather than uniform, power distribution enables the targets to accommodate significantly higher and unexpected power to be handled, without damage, than would appear likely, based upon a uniform power distribution of the scrape off flux. Accordingly, I have developed the divertor targets 52 in the form of swirl tubes 62, which, although possessing very efficient heat dissipation characteristics, have not been heretofore considered capable of dissipating heat of the quantity encountered in the fusion environment.

Referring to FIGS. 3–6, the divertor targets 52, which consitute the present invention, are shown in detail. The scrape off flux entering the scrape off region 56 (FIG. 2) is impinged upon targets 52 (FIG. 3) which are each in the form of a ladder structure 57 shown in FIG. 4 that extends around the entire length of vacuum chamber 22. The ladder structure 57 comprises inlet and outlet headers 58 and 60 positioned on opposite ends of an array of parallel target tubes 62. Each of the tubes 62 functions as a heat transfer element constituted by a swirl tube containing a twisted tape 63 shown in FIG. 5 and described in more detail infra. Swirl tubes of this type described and analyzed in "Oak Ridge National Laboratory Report—2911", April 1960 and in "Chemical Engineering Progress Symposium Series", Volume 57, Number 32, 1961.

The angle of incidence of the scrape off flux impinging on a pair of swirl tubes 62 and 62a of the ladder structure 57 (FIG. 4) is shown in FIG. 6. The plasma will enter the divertor guided by divertor coils 54 at a shallow angle relative to a plane of constant elevation of the reactor. The angle of incidence $\theta$ depends upon the safety factor of the plasma and the mean plasma aspect ratio. A typical angle of incidence, $\theta$, for example, is 10°. Of particular importance, however, the diameter d of the swirl tubes 62, 62a and the intertube spacing S are provided such that the region behind the tubes in opaque to scrape off plasma, that is, the scrape off plasma strikes only one half of each tube making maximum use of the available target heat transfer area. The number of target tubes in a poloidal divertor with targets on both sides of the lower quadrapole coil is $$N = \frac{4\pi r_1 \sin\theta}{d}$$

where:
$r_1$ is the average radius of the targets 52,
d is the target tube diameter, and
$\theta$ is the angle of incidence.

A plot of the number of target tubes versus incident angle $\theta$ in an exemplary reactor, specifically the SLPX described in PPPL-1500, supra, is shown in FIG. 7 as a function of target tube diameter.

The large number of swirl tubes in a poloidal divertor, each of which is exposed to extremely high heat flux, could result in frequent tube failure and loss of considerable operating time due to unscheduled target maintenance and replacement. Therefore, it is necessary to reduce the total number of tubes required by making the intertube spacing, S, as large as possible without compromising the opacity requirement of the region behind the tubes. Thus the region behind the target is opaque to the scrape of flux for all angles of incidence less than some specified design value, $\theta$, and not opaque for angles greater than the design value. The value of S satisfying these criteria is $S = d(\cot \theta)$.

Although a large amount of heat energy must be dissipated in the targets 52, the swirl tube configuration 62, shown in FIG. 5, provides adequate dissipation of heat when water or other liquid coolant is forced through the tubes by way of headers 58 and 60. The cylindrical tube 62 contains an internal twisted tape 63 (FIG. 5) such that the water or other coolant swirls on flowing through the tube. Surface boiling takes place in the tubes 62 and the swirling action of the coolant enhances scrubbing of steam bubbles from the inside surfaces of the tubes. Cold liquid, rushing through inlet header 58 to the tube surface area that was vacated by steam, results in very high heat transfer rates which are capable of causing the targets 62 to withstand very large power fluxes. Also, since the swirl tubes are heated only on one side, as shown in FIG. 6, their burnout fluxes will be about two to three times greater than the unform burnout flux reported in the Oak Ridge Report 2911, supra. The reason is that the heat is conducted away from the front area to the cooler rear side of the tube.

In U.S. Pat. No. 4,149,931, supra, a divertor target is described within the scrape off flux strikes the divertor chamber walls formed by collector plates. The collector plates are cooled by water cooling coils that are on the leeward side of the plates, i.e., the side opposite to that of scrape off flux impingement. In the present invention, on the other hand, the flux impinges directly on actively water cooled tubes 62 for sustantially improved heat transfer.

Figure 12:
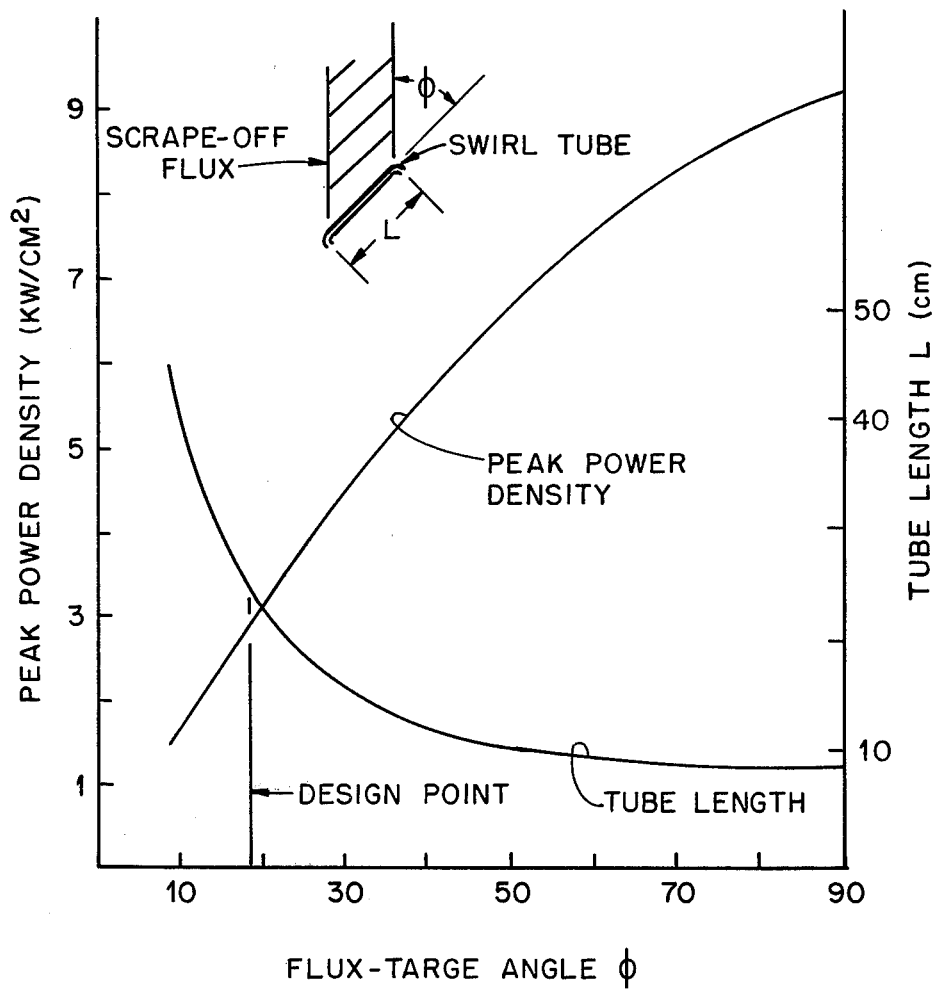
FIG. 12 is a graph showing the peak power on a swirl tube and the tube length as functions of the scrape off plasma flux-target plane angle $\phi$.

In a poloidal divertor, improper orientation of the target plane relative to the plane of the scrape off flux trajectory can result in a heat flux at the center of the swirl tubes 62 in excess of their allowable heat input. I have solved this problem by tilting the target plane at an angle $\theta$, relative to the plane of the scrape off flux trajectory (see FIGS. 3 and 12), thus spreading the heat input over a longer tube length. In FIG. 12, the peak power at the tube center as well as the swirl tube length is plotted as a function of the fluxtarget angle, $\theta$. The design parameters for determining the maximum angle, $\theta$, to satisfy the requirements of allowable swirl tube heat input and maximum tube length are the scrape off plasma, power, width, and angle of incidence, $\theta$ (see FIG. 6) as well as the divertor geometry. Specifically, $\theta$ must be small enough such that the heat input to swirl tubes 62 is less than a maximum rated input and large enough such that the length of the swirl tubes to interrupt the entire width of the plasma flux is no larger than a predetermined length corresponding to the divertor region 56. Stated mathematically, $$\frac{W}{L_m} < \phi < \sin^{-1}\frac{F_B}{F_{SO}}, \text{ where}$$

$F_B$ is the maximum rated heat input of the swirl tubes 62, $F_{SO}$ is the power density at the center of the scrape off region 56, W is the width of the scrape off plasma, and $L_m$ is the maximum allowable length of the swirl tube 62 based upon available space within the divertor 56. The calculations of FIG. 12 were made for the exemplary design parameters of the SLPX, with an exemplary design point angle, $\theta$, of 18°.

Preferably, in order to enable servicing of the divertor targets 52, the ladder structure 57 is fabricated in the form of modules such as units 64 and 66 shown in FIG. 11. The target tubes 62, which are U-shaped (see also FIG. 5), extend upwardly from headers 58 and 60 and are coupled to a source 68 and sink 69 (FIG. 4) of coolant under pressure to be coupled to the headers through quick disconnect couplings 70 and 72.

Since each of the divertor targets is formed of a series of modules 64, 66 of the type shown in FIG. 11, it is apparent that the targets 52 can be easily repaired by removing individual sections or modules of the divertor target at convenient couplings 70 and 72 rather than cutting and rebrazing indivdual target tubes upon failure.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein. For example, it is to be understood that the targets 52 of the present invention can be applied for impurity removal in high energy environments other than a tokamak system, such as a magnetic mirror device, stellarator or ELMO bumpy torus device. Particular advantages are realized, however, by the active cooling of the targets in the manner described and by the structure and orientation of the swirl tubes with respect to the incident flow path of the scrape off flux.

I claim:

1. In a magnetic field containing device of the type including a toroidal-shaped vacuum vessel adapted to contain a plasma, first electromagnetic coil means distributed in proximity to said vessel for shaping the plasma within said vessel, and second electromagnetic coil means for diverting a scrape-off flux from an outer region of said plasma to a divertor region for removal by a vacuum producing means of impurities within the plasma; the improvement comprising:

toroidal vacuum vessel means having contained therein a vacuum including a divertor region and a magnetically diverted scrape-off plasma flux;

input and output parallel headers having fluid coolant means forming modules circumferentially coupled together within the vacuum vessel vacuum of the divertor region and:

a target, comprising an array of spaced-apart, swirl tube means in the vacuum vessel vacuum of the divertor region arranged in a plane to form a ladder configuration between the input and output parallel headers;

said swirl tube means being positioned within the path of the scrapeoff plasma flux and transverse thereto so that plasma flux impinges on the outside of the spaced-apart swirl tube means at an acute angle of incidence $\theta$ such that only one side of each swirl tube is exposed to plasma flux;

the plane of the spaced-apart swirl tube means being oriented at an acute angle $\theta$ with respect to the flux path so that plasma flux impinges directly on said spaced-apart swirl tube means in the vacuum vessel vacuum of the diverter region;

said headers for circulating a fluid coolant through the vacuum vessel vacuum of the divertor region and through said spaced-apart swirl tube means from the inlet header to the outlet header;

the respective ends of the swirl tubes being formed to the input and output parallel headers.

2. The invention of claim 1 in which the spaced-apart swirl tube means are spaced-apart from each other at a distance S, where S=d (cot $\theta$), and said modules are circumferentially coupled together within said vacuum vessel means around the circumference thereof, such that the swirl tube means prevent pass-through of the scrape off flux to a region behind the spaced-apart swirl tube means in the vacuum vessel vacuum of the divertor region.

3. The device of claim 1, wherein said target comprises N swirl tube members, where $$N = \frac{4\pi R_1 \sin\theta}{d}$$

where $R_1$ is an average radius of the plasma, and d is the diameter of each tube member.

4. The device of claim 1, wherein said array is module form said target comprises a plurality of ladder modules circumferentially coupled together within said vacuum vessel, and quick-release means for enabling removal of individual ones of said modules from said target for servicing.

5. The device of claim 3, wherein said swirl tubes are spaced apart from each other at a distance S, where S=d(cot $\theta$), such that a minimum number of said target swirl tubes are required to prevent pass through of said scrape off flux to a region behind said tubes.

6. The device of claim 1 wherein the plane of the target is oriented at an acute angle $\phi$ with respect to the plane of the path of the scrape off flux, satisfying the following condition:

$$\frac{W}{L_m} < \phi < \sin^{-1}\frac{F_B}{F_{SO}}, \text{ where}$$

$F_B$ is the maximum rate heat input of swirl tubes 62,
$F_{SO}$ is the power density at the center of the scrape off region,
W is the width of the scrape off plasma, and
$L_m$ is the maximum allowable length of said swirl tubes based upon available space within said divertor region.

* * * * *